Patented Mar. 1, 1938

2,109,948

UNITED STATES PATENT OFFICE 2,109,948

RUBBER COMPOSITIONS

Robert R. Olin, Akron, Ohio, assignor to The Worthington Ball Company, Elyria, Ohio, a corporation of Ohio No Drawing. Application September 26, 1935, Serial No. 42,286

4 Claims. (Cl. 106—23)

The present invention relates to improvements in rubber composition and process and relates more particularly to the manufacture of caoutchouc compositions, which involve more particularly an improved composition of matter forming an article of commerce involving a mixture of vulcanized caoutchouc or rubber material with an unvulcanized gum of the type represented by the product of certain tropical trees, commonly called balata, and an improved golf ball comprising an outer cover having as its chief constituent the said composition of matter; both rubber and balata materials are originally secured in the form of a milky latex from tropical plants producing them and may be subsequently susceptible of being dried to form gummy substances and by subsequent treatment are susceptible of being vulcanized to change physical properties of the materials. Although rubber is commonly exported from the point of origin to the United States of America and elsewhere, in the form of the original latex, balata is very seldom so exported except in the form of a crude gum.

It has previously been proposed to provide outer covers for golf balls having refined balata as its principal constituent and in at least one case, as disclosed in United States Letters Patent No. 1,405,845, to Harry A. Hoffman, dated February 7, 1922, it is proposed to provide such a cover comprising these materials in the preferred relative proportions of 90% balata and 10% rubber, both of said materials being in the solid vulcanized state; golf ball covers which have been previously used employing either vulcanized or substantially unvulcanized balata without the addition of vulcanized rubber thereto, have been commonly used but upon commonly occurring improper striking by the head of a golf club when the balls are in play, the covers which, although including a small amount of rubber material in combination with a major constituent of vulcanized balata, are still somewhat susceptible to the objection of cutting. Moreover, in the latter case, the commercial production and application of the covers and the painting thereof are only achieved at an undesirable high cost.

I have discovered that by the mixture of a previously vulcanized rubber latex with unvulcanized balata, the rubber latex being previously and separately prepared in any suitable manner, but preferably as set forth in United States Letters Patent No. 1,443,149 to Philip Schidrowitz, dated January 23, 1923, and preferably also involving the improved method as set forth in United States Letters Patent No. 1,939,635 to Henry B. Townsend, dated December 12, 1933, that a highly improved cover stock for golf ball covers may be evolved having superior properties of toughness to avoid cutting of the ball when improperly struck by golf clubs to play and without any appreciable loss in efficiency or desirable properties involved in the play of the ball, such as distance, "click", and putting effects.

At the same time, I find that the use of a previously vulcanized rubber latex material in the finished composition comprising unvulcanized balata material in suitable proportions effects a very considerable economy in the manufacture of golf ball covers, since scraps of the material left over during the manufacturing process may readily be re-used with new material without appreciable change in the resultant properties of the resultant cover stock to effect inferiority in the properties of the completed covered golf ball.

In the production of the cover material as a composition of matter, I have evolved an improved process whereby the manufacture of this composition of matter can be more efficiently accomplished both as to superiority of resultant product and manufacturing operations.

My invention, therefore, has as an object the production of an improved composition of matter which has a particular application as cover material for golf balls, although not limited thereto.

Another object of my invention is to provide a composition of matter which when utilized in a composition for golf ball covers results in the covers being less readily cut in play with no appreciable loss in the other desirable qualities of a golf ball cover as compared to the prior balata covers.

Another object of my invention is to provide an improved composition of material comprising a substantially homogeneous mixture of vulcanized rubber and unvulcanized balata in varying proportions for different uses.

Another object of my invention is to provide an improved golf ball cover.

Another object of my invention is to provide an improved golf ball of superior playing qualities having a cover which is not unduly susceptible to cutting blows.

Another object of my invention is to provide an improved golf ball cover which may be readily painted without requiring unduly expensive special treatment preliminary thereto.

Another object of my invention is to provide for economical manufacture of superior cover stock for golf balls and the like.

Another object of my invention is to provide an improved cover for golf balls comprising unvulcanized balata and having superior heat resisting qualities as compared to prior balata covers.

Another object of my invention is to provide an improved process for manufacturing the improved composition of material as above set forth.

Other objects of my invention and the invention itself will become more apparent by reference to the following specification which sets forth my invention in its different aspects as I preferably embody said invention.

Workers in the rubber arts and in the art of manufacturing golf balls recognize the essential difference in properties and necessary differences in working the material, called balata, which may be secured as a milky juice from tropical plants indigenous to Brazil, and which is commonly dried for export into the form of a balata gum, and other kindred products such as caoutchouc or rubber which is secured in the form of latex as a milky or colored juice from several different plants of tropical South America, Asia and Africa, and which when vulcanized is used for many purposes.

It is found that balata gum can also be vulcanized and as an instance thereof reference is hereby made to the above mentioned patent to Hoffman, which discloses a golf ball cover material employing vulcanized rubber and vulcanized balata.

I believe, however, that it has never heretofore been recognized that a composition of material comprising chiefly unvulcanized balata and vulcanized rubber, as herein set forth, suitable for a variety of uses requiring a tough resilient material but more particularly golf ball covers, could be commercially produced, and which in any event would have the highly advantageous properties secured in the material of my invention and at the same time resulting in economies of manufacture effected by use of this material.

The instant case is divisional of my application Serial No. 97, filed January 2, 1935, for Rubber compositions and process. In the aforementioned application Serial No. 97, I disclose a process by which the above-described material could be made and another process by which said material may be made is described in a copending application of W. E. Reichard and R. R. Olin, Serial No. 96, filed January 2, 1935, for Rubber compositions and process.

I preferably prepare my improved composition by the following manner. First, an aqueous vulcanized substantially uncoagulated caoutchouc-containing material, which I term vulcanized rubber latex, is prepared preferably according to the teachings of the aforesaid Schidrowitz and Townsend patents.

Various means well known in the art may be employed in preparing the balata, one method being hereinafter described.

The balata gum as received is in relatively large units which are chopped into comparatively fine pieces. The chopped pieces of balata are then forced through rolls which masticate the balata and squeeze considerable water therefrom, the balata being delivered from the rolls in crushed, shredded form and then dried.

The balata gum is then washed in gasoline to substantially remove the impurities including resins which are dissolved by the gasoline. The purified and de-resinated balata gum is then dried in any suitable manner as by being placed in a tumbling barrel. Upon removal from the tumbling barrel, the balata is placed in a tank containing benzol or like solvent, the balata being dissolved and forming with the solvent a thick syrupy fluid and impurities are further removed by sedimentation and the purified solution being drawn off at a point above the sediment line. The balata is then coagulated in any suitable manner as by subjecting the same to a bath of alcohol, acetone, or the like, and subsequently run through rolls which reduces it to relatively thin sheets which are then allowed to dry for a sufficient period to substantially remove the water content.

The coagulated balata is then thoroughly intermixed with the uncoagulated vulcanized rubber latex in any suitable manner but preferably by disposing the coagulated balata between heated masticating rolls and concurrently adding the liquid vulcanized rubber latex thereto at the rolls whereby the balata and vulcanized rubber latex will be thoroughly intermingled resulting in a homogeneous mixture upon delivery from the rolls. The coagulated balata and uncoagulated vulcanized rubber latex may also be mixed in an internal rubber mixer of the Banbury type.

The heat effected by the rolling operation will vaporize the water in the latex dispersion, resulting in a coagulated homogeneous mass delivered from the rolls, but I also contemplate that the vulcanized latex dispersion may be coagulated prior to delivery to the rolls in any suitable manner; and the separately coagulated balata and vulcanized latex products may be then intimately mixed in any suitable manner as by a milling roll operation, but from a standpoint of resultant product and economy, I prefer the first described means.

I also contemplate that the mixture may comprise various compounding materials other than those promoting vulcanization of the coagulated balata and which materials are avoided but may comprise glue and coloring pigments such as zinc oxide or titanium dioxide. The glue if used is preferably added in liquid form to the vulcanized rubber latex dispersion prior to application of the latex dispersion to the rolls and the coloring matter is preferably added during the mixing operation.

Although the relative amounts of the ingredients may vary considerably, dependent upon the use intended for the resultant product, I find that a mixture comprising 20 lbs. of balata, 15 lbs. dry weight of vulcanized rubber compound, in the form of a vulcanized latex dispersion, 5 lbs. of glue (preferably added as previously described) and 6 lbs. of coloring material, provides a golf ball cover having the very desirable aforementioned characteristics as to toughness. I preferably employ as the coloring material in the above mixture, a pigment comprising zinc oxide.

The mixture upon delivery from the rolls may be further processed to provide sheets of a desired thickness from which discs of the proper size may be stamped and at the same time or subsequently formed into substantially hemispherical cups. These cups are then placed over the golf ball core in opposite cooperative core-enclosing relation, and then under the influence of great pressure and heat, the hemispherical halves are melted and pressed together to form a spherical enclosure for the golf ball with the proper surface marking, which is determined by the inner surface formed by the press dies.

However, in providing sheets from which the discs are stamped, a certain amount of waste material intermediate the discs is necessary which approximates 25% and I therefore preferably mix such waste material on the mixing mill with fresh material supplied thereto as previously described. An alternate method of preparing discs is by feeding the mixture through an extruding machine to form a cylindrical bar which may be cooled by running the same through a water bath and discs of a desired thickness are then sliced from the cylindrical lengths. These discs are then formed into substantially hemispherical cups to form the golf ball cover as previously described.

The overflow of cover stock at the juncture of the cover halves is trimmed from the balls and incidentally this extra material which in prior vulcanized constructions is ordinarily wasted, can also be added to the masticating rolls with new composition material and without appreciably adversely affecting the properties of the resultant covers. This re-use of the by-product portions of the material is susceptible of accomplishment because the balata material is not substantially vulcanized at any stage in the process.

The above description relates to a typical embodiment of my invention involving a particular routine employed for the manufacture of complete golf balls having covers embodying the improved composition material of my invention. I am aware, however, that the cover material may be employed to cover golf balls in other ways than as described, but within the scope of my invention.

While I have above described my invention used for the purpose of providing improved golf balls comprising covers which include as a principal constituent my improved composition of material as evolved by the described improved process, I am aware that numerous other uses may be made of the improved composition material as above set forth, and it is understood that I do not wish to be limited thereto. For other purposes than golf balls, the best proportions might be considerably different and in a different range of relative proportions from the composition described. I therefore claim my invention more broadly than any particular proportion for general uses.

Although in the specification and the subjoined claims I have referred to rubber, balata, and latex, it will be understood that I contemplate that these terms shall be construed in the broadest sense to include the equivalent materials which are either natural or synthetic products and independently of their origin; and where such terms employed in the claims as a matter of convenience, they are to be construed in the light hereof.

Having thus described my invention as I prefer to practice it, I claim:

1. An improved composition of matter comprising a substantialy homogeneous mixture of vulcanized latex rubber, an unvulcanized substantially pure gum comprising balata or like material, and a binder such as glue comprising fifteen percent or less by weight of the composition.

2. An improved composition of matter comprising a substantially homogeneous mixture of vulcanized latex rubber, an unvulcanized substantially pure gum comprising balata or the like material, a coloring pigment and a binder such as glue, the coloring pigment and binder comprising twenty-five percent or less by weight of the composition.

3. An improved composition of material comprising discs having as principal constituents vulcanized latex rubber, unvulcanized de-resinated balata, and fifteen percent or less by weight of a binder such as glue.

4. An improved composition of matter comprising a substantially homogeneous mixture consisting of substantially twenty parts by weight of unvulcanized de-resinated balata, fifteen parts by weight of vulcanized latex rubber, five pounds by weight of glue, and six pounds by weight of coloring pigment.

ROBERT R. OLIN.